H. O. HEM.
WEIGHING SCALE.
APPLICATION FILED DEC. 21, 1916.
1,378,110.
Patented May 17, 1921.
5 SHEETS—SHEET 3.
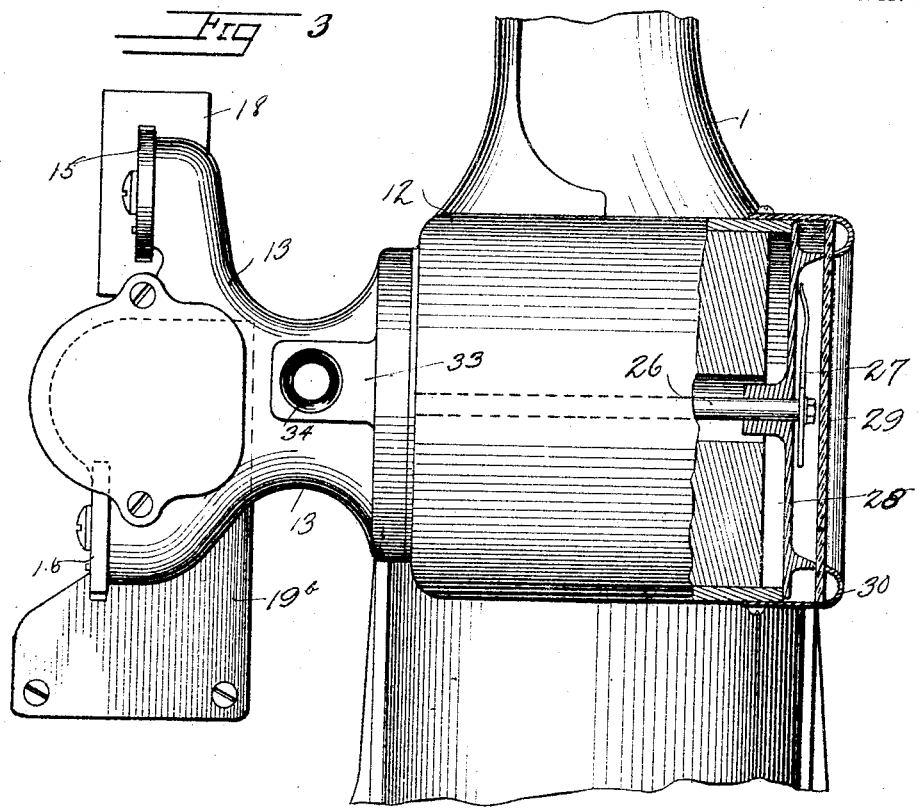
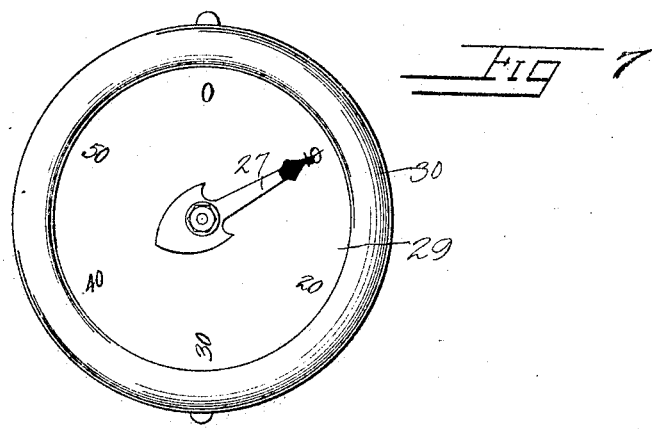
Witnesses
Inventor
Halvor O. Hem
by George R. Frye
Atty.

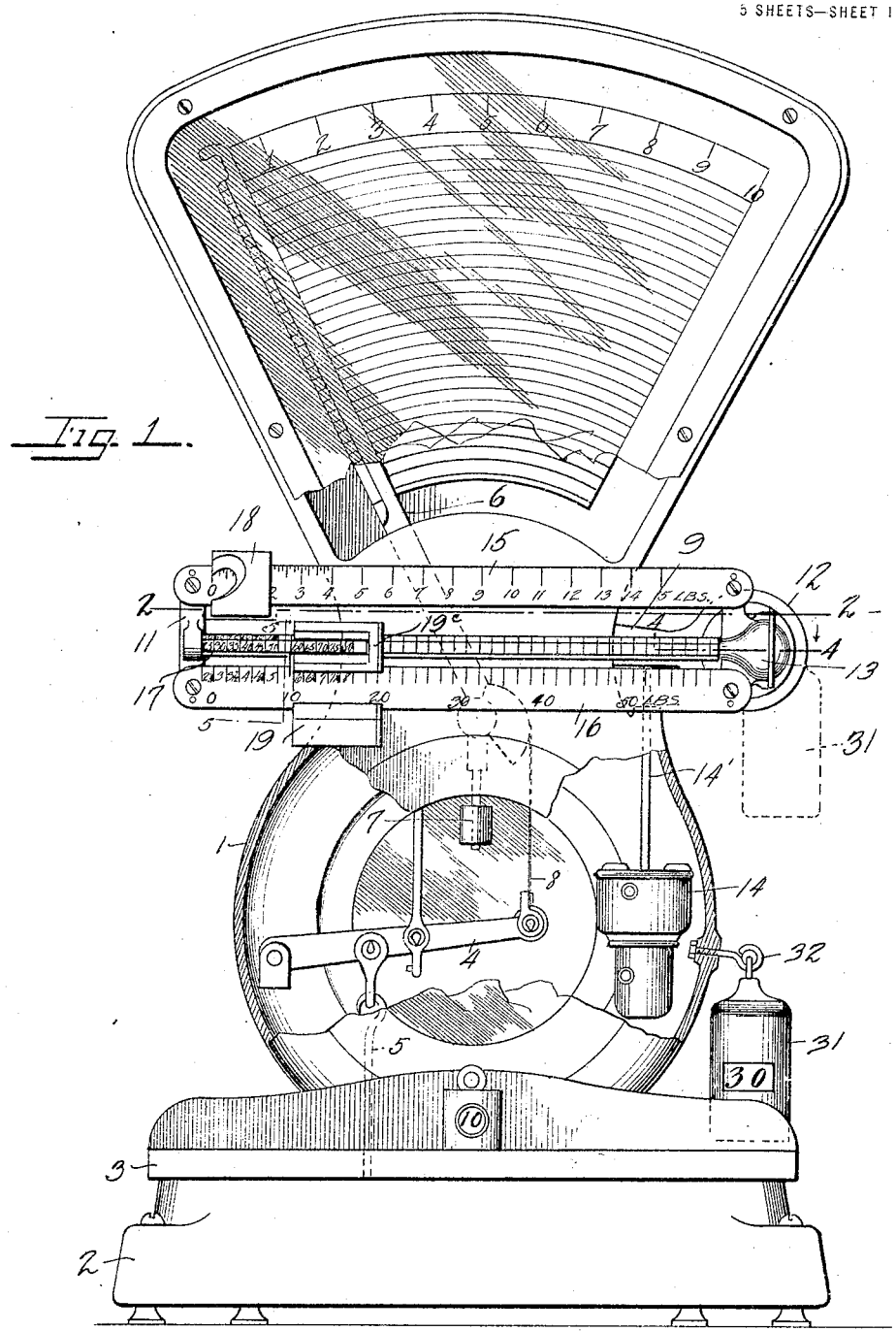

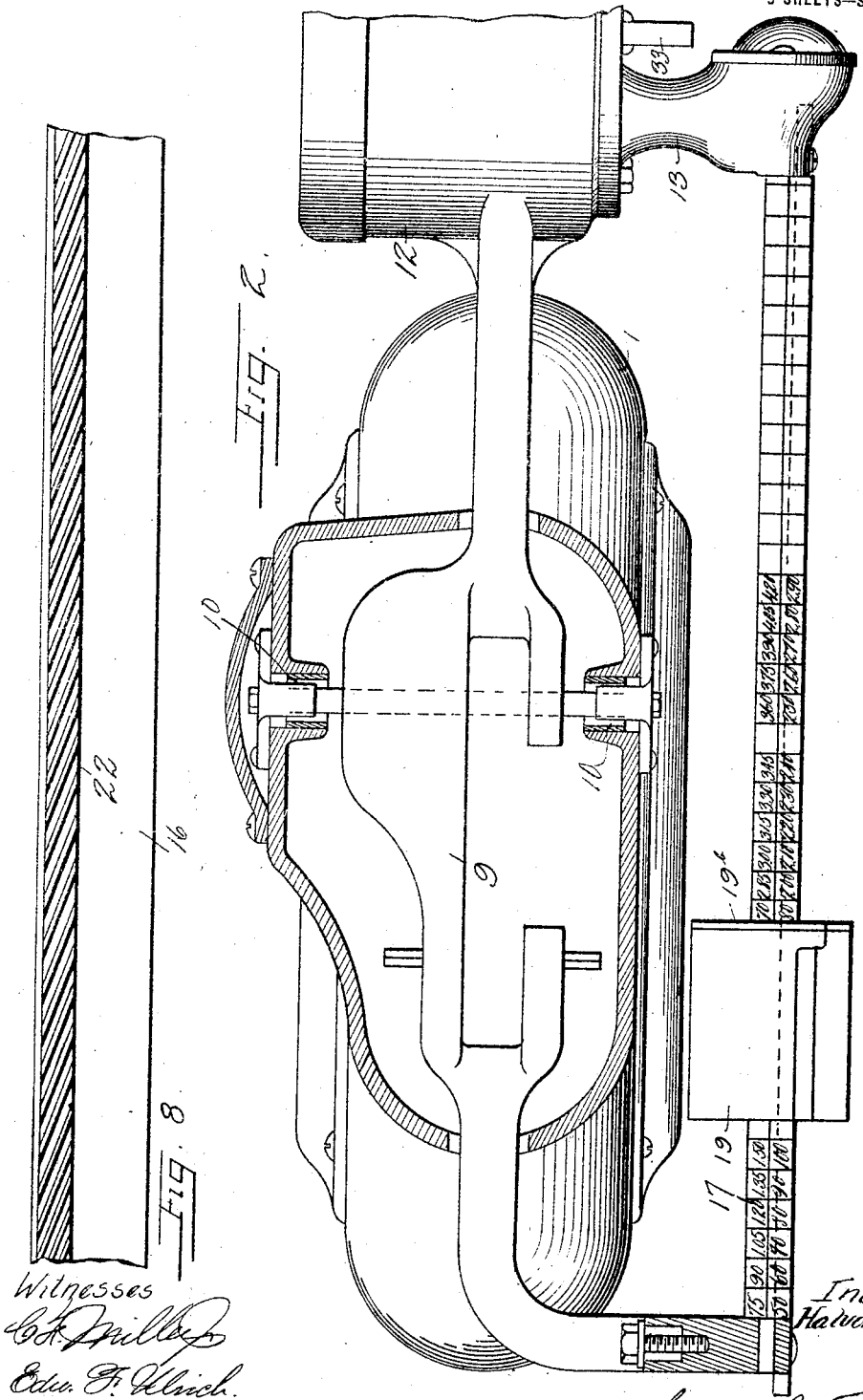

H. O. HEM.
WEIGHING SCALE.
APPLICATION FILED DEC. 21, 1916.
1,378,110.
Patented May 17, 1921.
5 SHEETS—SHEET 4.
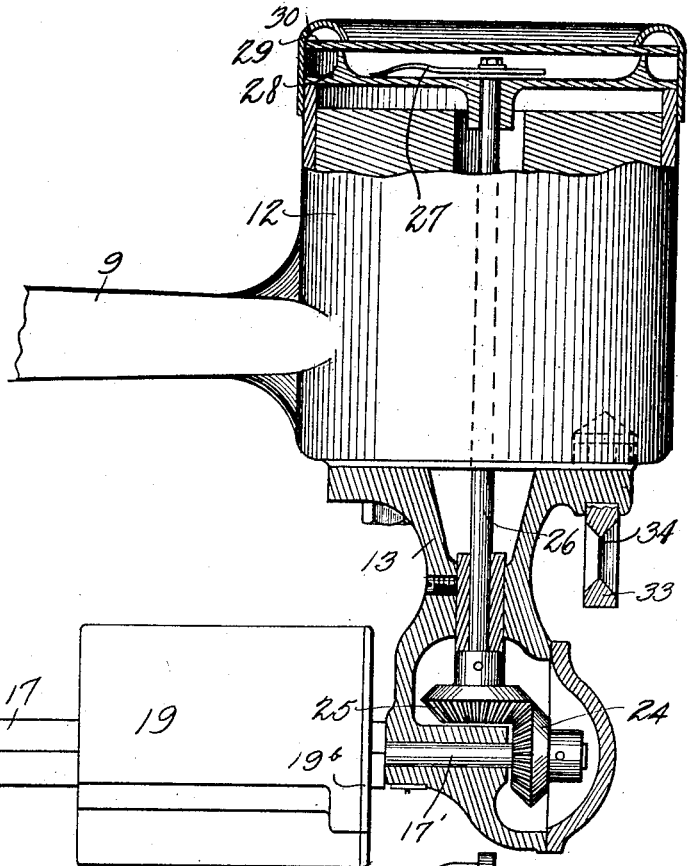
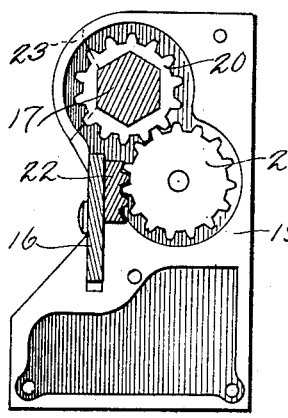
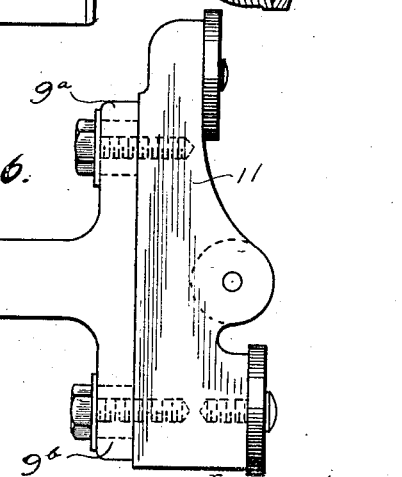
Witnesses
Inventor—
Halvor O. Hem.
by George R. Frye.
Atty.

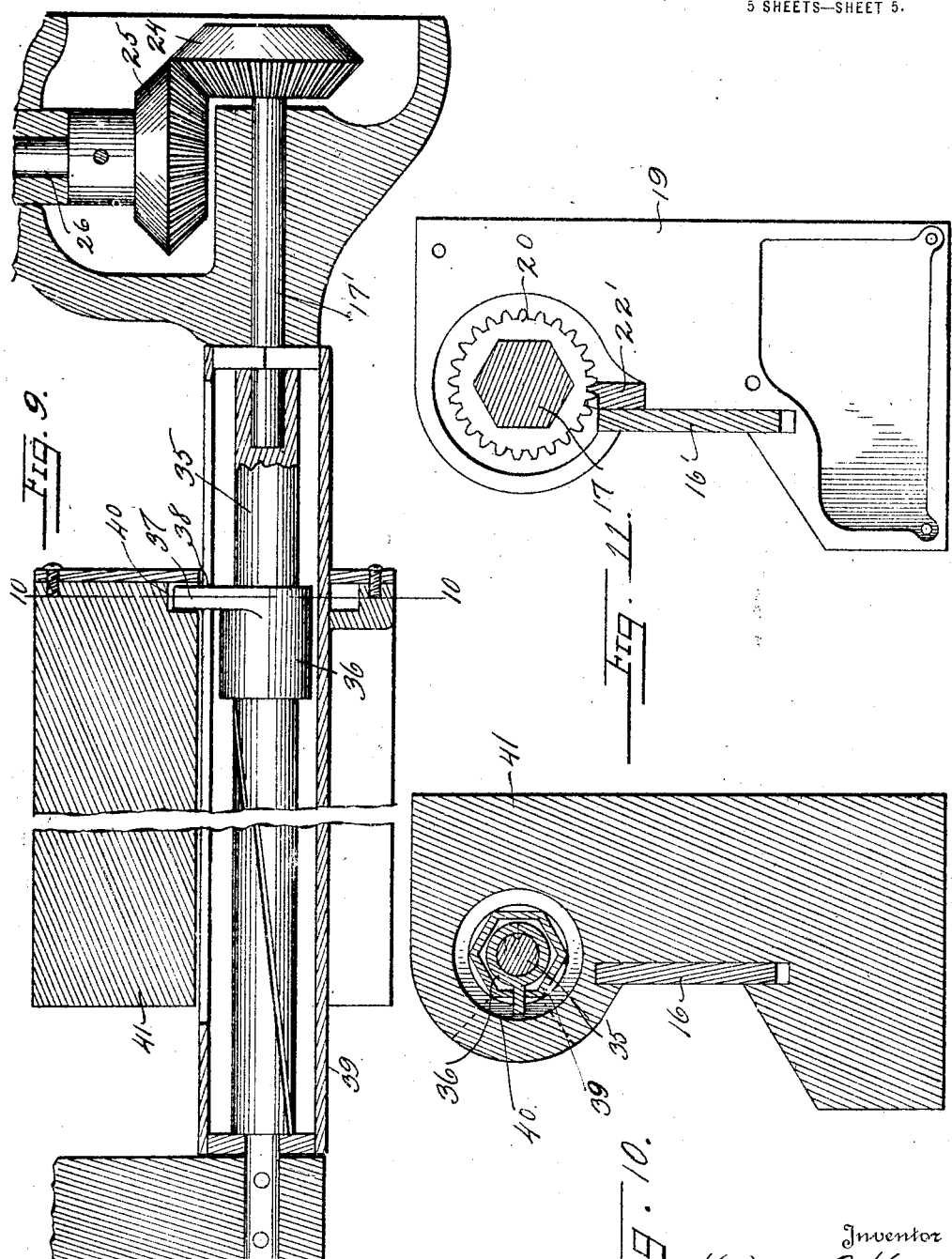

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING-SCALE.

1,378,110.   Specification of Letters Patent.   Patented May 17, 1921.

Application filed December 21, 1916. Serial No. 138,199.

*To all whom it may concern:*

Be it known that I, HALVOR O. HEM, a citizen of the United States, residing at Toledo, in the county of Lucas and State of Ohio, have invented certain new and useful Improvements in Weighing-Scales, of which the following is a specification.

This invention relates principally to weighing scales of the semi-automatic type, although it may be used on scales of many different types and particularly scales having one or more tare and increased capacity beams. Counter scales of this type are usually provided with computing charts, but the user is compelled to compute the prices of various commodities when using the scale in a capacity exceeding that of the chart.

The primary object of my invention is to provide a computing mechanism adapted to be actuated by the beam poise and by which means prices of commodities weighing more than the capacity of the chart may be computed.

A further object of my invention is to provide a scale adapted to indicate at the customers' side thereof the exact location of the poise upon the beam.

With these and other objects in view which will be apparent from the following description, my invention resides in the novel construction, combination and arrangement of parts more fully described in the following specification and particularly pointed out in the appended claims.

Referring to the drawings wherein I have illustrated a preferrd embodiment of my invention and wherein similar reference numerals designate corresponding parts throughout the several views, Figure 1 is a front elevation, partly in section, of a weighing scale equipped with my invention; Fig. 2 is a horizontal sectional view taken on the line 2—2 of Fig. 1; Fig. 3 is a fragmental side elevation, partly in section; Fig. 4 is a detail horizontal sectional view taken on the line 4—4 of Fig. 1; Fig. 5 is a vertical sectional view taken on the line 5—5 of Fig. 1; Fig. 6 is a detail end elevation showing a preferred method of supporting the beams; Fig. 7 is a detail rear elevation of the position indicator for the poise; Fig. 8 is a rear elevation of the rack bar; Fig. 9 is a horizontal sectional view of another form of the computing member actuating mechanism; Fig. 10 is a transverse sectional view taken on the line 10—10 of Fig. 9; and Fig. 11 is an end view of the poise illustrating a further modified construction for actuating the computing member.

Referring more specifically to the drawings, 1 designates a housing supported upon a base 2 inclosing platform levers (not shown) upon which rests a platform 3. An auxiliary lever 4 pivotally mounted within the housing 1 is connected to the platform levers by means of a lower steelyard 5, and is adapted to operate both the index hand 6 carried by the pendulum 7 through the flexible connection 8, and the lever carrying the tare and increased capacity beams. This main lever 9 is fulcrumed within the housing 1 above the auxiliary lever 4 in pivot bearings 10. One end of the lever 9 extending out beyond the housing 1 is bent forwardly and has upper and lower slotted projections $9^a$ and $9^b$ adjustably supporting the bracket 11. The opposite end of the lever 9 extends without the housing and carries a counterpoise 12, which has secured to the front end thereof a bracket 13. A dash pot 14 mounted within the housing 1 is connected with the lever by means of the plunger rod 14'. Upper and lower graduated beams 15 and 16 are secured at their opposite ends to the brackets 11 and 13 respectively. These beams 15 and 16 are marked with weight graduations, while either or both may be arranged to coöperate with a computing member 17 rotatably mounted on the brackets 11 and 13. As herein shown, the computing mechanism is arranged to coöperate with the poise of the lower beam 16 and is formed with a trunnion 17' extending through the bracket 13 for a purpose hereinafter set forth. An upper tare beam poise 18 of the usual construction is slidably mounted upon the beam 15 and indicates weights only, in the well-known manner. The lower poise 19 of novel construction engages over the beam 16 and the computing member 17. Adjacent one extremity the poise 19 is adapted to carry intermeshing gears 20 and 21, the gear 20 fitting loosely over and turning with the computing member 17 and meshing with the gear 21, which in turn meshes with a spiral rack bar 22 longitudinaly disposed with and secured to the beam 16 (see Figs. 5 and 8). An end plate $19^b$ is secured to the poise 19 over the gears 20 and 21, thereby keeping said gears free from dust, etc.

For reasons of illustration I have shown the upper beam 15 as graduated in pounds and fractions thereof, up to fifteen pounds, and the lower beam 16 graduated in ten-pound graduations with a capacity of fifty pounds. The beam 16 may be further provided adjacent the computing member 17 with a plurality of price per pound indications, and the computing member 17, which in this instance is hexagonal in cross section, is provided with corresponding graduations having the computed prices for each ten pounds marked upon the various faces thereof. For example, as in this instance the beam 16 is only designed with a capacity of 50 lbs., there need only be five faces of the computing member 17 bearing computations, leaving the sixth side blank. When the poise is at the zero mark upon the scale, the blank face of the hexagonal bar will be in view. As the poise 19 is moved along the beam to each successive ten pound mark, the computing member is rotated correspondingly by virtue of the gear 21 meshing with the spiral rack bar 22, so that the computation will be the price of the number of indicated pounds of the commodity at the corresponding price per pound. The poise 19 is preferably cut away as at 23 to uncover that portion of the computing member which is within the poise 8. However, the portion 19° of the poise which receives the gears 20 and 21 must necessarily surround the computing member, and, as will be seen upon reference to Figs. 1 and 2, certain spaces are left blank, which coincide with the portion 19° when the poise is in register with several 10 lb. graduation marks on the beam so that there will be no computations hidden when it is desired to read the price of the commodity being weighed.

Secured to the trunnion 17' of the computing member is a bevel gear 24 meshing with a similar gear 25 keyed to a shaft 26 journaled in the bracket 13 and extending through the counterpoise 12. The shaft 26 may also be provided with an indicating hand 27 upon the rear end thereof coöperating with a dial 28 upon the rear portion of the counterpoise 12 having weight indications thereon corresponding in value to the weight graduations upon the beam 16. A glass cover 29 is positioned over said dial 28 and is held thereon by means of a bezel 30 secured to the counterpoise 12. It will readily be observed that as the poise 19 is moved along the beam 16, the computing member 17 will be rotated by means of the spiral rack 22 and gears 20 and 21 and will cause the indicator hand 27 to revolve by virtue of the beveled gears 24 and 25 driving the shaft 26.

Referring to the modification illustrated in Figs. 9 and 10, the bevel gears 24 and 25 are keyed to the shafts 17' and 26 respectively and are supported in the bracket 13, as disclosed in Fig. 4. A spirally-grooved shaft 35 is fixedly supported by the bracket 11 and provides a bearing in which the shaft 17' may rotate. The shaft 35 is secured against rotation by suitable securing means, such as dowel pins, passing transversely therethrough and has movably mounted thereon a sleeve 36 arranged to rotate as it is moved longitudinally of the shaft through a lug sliding in the spiral groove. The sleeve is formed with a finger 37 which passes through a slot 38 in the hollow hexagonal computing member 39 rotatably mounted upon the shaft 35 and into a circular recess 40 formed in the end of the poise 41 carried by the beam 16 and surrounding the computing member 39. It will be apparent that as the poise is moved along the beam the walls of the recess 40 will bear against the finger 37 and cause the sleeve 36 to be moved longitudinally of the spirally-grooved shaft 35, the longitudinal movement of the sleeve thereon causing it to revolve and in turn revolving the computing member. The portion of the shaft 17' which passes through the end of the member 39 is non-circular so that as the member 39 turns, the shaft 17' turns with it.

In Fig. 11 is shown a mounting of the long rack-bar and coöperating pinion only slightly modified from that shown in Fig. 5. The spiral rack 22' is carried by the beam 16' on the upper end thereof and the rack teeth are formed upon the top of the rack-bar. The teeth of this rack 22' mesh directly with the teeth of the gear 20 carried by the hexagonal computing member 17.

When it is desired to weigh comparatively heavy commodities, for instance, an article of about a hundred pounds weight, a weight 31 normally supported upon a bracket 32 upon the housing 1 may be attached to the end of the main lever 9 adjacent the counterpoise 12, this pendant weight increasing the capacity of the beam in the usual manner. For this purpose I provide a lug 33 (see Fig. 4) secured to the counterpoise 12 and provided with an eye 34 forming a knife edge support for the weight 31.

While it will be apparent that the illustrated embodiments of my invention herein disclosed are well calculated to adequately fulfil the objects primarily stated, it is to be understood that the invention is susceptible to modification, variation and change without departing from the spirit and scope of the invention as set forth in the subjoined claims.

Having described my invention, I claim:

1. In a weighing scale and in combination with the main lever thereof, a graduated beam mounted upon the lever, a poise slidable thereon, a computing member mounted upon said lever, and rotatable means mounted within the poise, said beam being formed with means adapted to engage said rotatable means for rotating said computing member when the poise is moved on the beam.

2. In a weighing scale and in combination with the main lever thereof, a beam mounted upon said lever, a computing member mounted upon said lever above said beam, a poise slidably engaging said beam and said computing member, and rotatable means mounted within said poise, said beam being formed with means adapted to engage said rotatable means for rotating said computing member as the poise is moved on the beam.

3. In a weighing scale and in combination with the main lever thereof, a beam mounted upon said lever, a computing member mounted upon said lever above said beam, a poise slidably engaging said beam and said computing member, and rotatable means carried by said poise and surrounding the computing member, the beam being formed with means for engaging said rotatable means for actuating said computing member as the poise is moved along the beam.

4. In a weighing scale and in combination with the main lever thereof, a beam carried by said lever having weight and price per pound graduations thereon, a computing member mounted in said lever and bearing price computations, a poise slidably engaging said beam and said computing member, and rotatable means carried by said poise, said beam being formed with means adapted to engage said rotatable means for causing said computing member to exhibit the price of the commodity at predetermined prices per pound per indicated weight.

5. In a weighing scale and in combination with the main lever thereof, a beam carried by said lever having weight and price per pound graduations thereon, a computing member mounted in said lever and bearing price computations, a poise slidably engaging said beam and said computing member, and rotatable means carried by said poise, said beam being formed with means adapted to engage said rotatable means for rotating said computing member to exhibit the price of the commodity at predetermined prices per pound per indicated weight.

6. In a weighing scale, in combination with the main lever having a counterpoise at one end thereof, a beam carried by said lever having weight and price per pound graduations thereon, a computing member rotatably mounted upon said lever and having price computations thereon, a poise slidably engaging said lever and said computing member, means carried by said poise for causing the computing member to exhibit the prices of commodities per indicated weight at predetermined prices per pound, and means actuated by said computing member for indicating at the rear of the scale the position of the poise upon the beam.

7. In a weighing scale, in combination with the main lever having a counterpoise at one end thereof, a beam carried by said lever having weight and price per pound graduations thereon, a computing member rotatably mounted upon said lever and having price computations thereon, a poise slidably engaging said lever and said computing member, means carried by said poise for causing the computing member to exhibit the prices of commodities per indicated weight at predetermined prices per pound, and means carried by said counterpoise and actuated by said computing member for indicating the position of the poise upon the beam.

8. In a weighing scale a beam having a poise slidable thereon to increase the weighing capacity of the scale beam and poise computing mechanism associated therewith, means independent of the poise and actuated by said mechanism for indicating the increased weighing capacity of the scale.

9. In a weighing scale a beam having a poise slidable thereon to increase the weighing capacity of the scale beam and poise computing mechanism asociated therewith, means independent of the poise and actuated by said mcehanism for indicating at the rear of the scale the increased weighing capacity of the scale.

10. In a weighing scale and in combination with the main lever thereof, a beam carried thereby and having a poise slidable thereon to increase the weighing capacity of the scale beam computing mechanism associated therewith, a counterpoise mounted adjacent one end of said lever, and means carried by said counterpoise and actuated by said computing mechanism for indicating the increased weighing capacity of the scale.

11. In a weighing scale and in combination with the main lever thereof, a beam carried thereby and having a poise slidable thereon to increase the weighing capacity of the scale beam computing mechanism associated therewith, a counterpoise mounted adjacent one end of said lever, and means carried by said counterpoise and actuated by said computing mechanism for indicating at the rear of the scale the increased weighing capacity of the scale.

12. In a weighing scale and in combination with the main lever thereof, beam computing mechanism carried thereby, a counterpoise mounted adjacent one end of said lever, a dial mounted upon the end of said counterpoise, a shaft revolubly mounted within said counterpoise, an index hand on the shaft, and means connecting said shaft with said computing mechanism whereby said index hand will indicate upon the dial the increased weighing capacity of the scale.

13. In a weighing scale and in combination with the main lever thereof, a beam carried by said lever having weight and price per pound graduations thereon, a computing member mounted in said lever and bearing price computations, a spiral rack bar carried by said beam, a poise slidably engaging said beam and said computing member, and means carried by said poise and actuated by said rack bar for causing said computing member to exhibit the price of a commodity per indicated weight at predetermined prices per pound.

14. In a weighing scale, a housing, a main lever fulcrumed within the housing and having a counterpoise at one end thereof, a beam carried thereby and having a poise slidable thereon to increase the weighing capacity of the scale, computing mechanism carried by said lever, means carried by said counterpoise and actuated from said poise for indicating at the rear of the scale the increased weighing capacity of the beam, and means mounted in said housing and connected to said lever to damp the movement of said lever and associated elements.

15. In a weighing scale, a housing, pendulum weighing mechanism therein, a main lever fulcrumed within the housing, computing mechanism carried by said lever, means for simultaneously actuating both the lever and pendulum mechanism, and damping means mounted within the housing and connected with said lever.

16. In a weighing scale, in combination with the main lever thereof, a beam carried by said lever, a computing member carried by said lever, a poise slidable upon said beam and said computing member, a spiral rack carried by said beam, a gear carried by said poise and fitting over said computing member, and a gear intermeshing said rack and said first named gear adapted to rotate said computing member.

17. In a weighing scale, in combination with the main lever thereof, a beam carried by said lever, a computing member carried by said lever, a poise slidable upon said beam and said computing member, a spiral rack carried by said beam, a gear carried by said poise and fitting over said computing member, a gear intermeshing said rack and said first named gear adapted to rotate said computing member, and indicating means carried by said lever and actuated by said computing member for indicating at the rear of the scale the position of the poise upon the beam.

18. In a weighing scale, in combination with the main lever thereof, a beam carried by said lever, a computing member carried by said lever, a poise slidable upon said beam and said computing member, a spiral rack carried by said beam, a gear carried by said poise and fitting over said computing member, a gear intermeshing said rack and said first named gear adapted to rotate said computing member, a gear carried by said computing member, a shaft carried by said lever and geared to said computing member, and means secured to said shaft and actuated by said computing member for indicating at the rear of the scale the position of the poise upon the beam.

19. In a weighing scale and in combination with the main lever thereof, beam computing mechanism carried thereby including a slidable poise, a vertical dial mounted upon the lever and bearing weight indications facing the rear of the scale, a rotatable indicator hand, and means actuated upon movement of the poise to rotate the indicator hand around the dial to indicate the amount of weight offset by the poise.

HALVOR O. HEM.

Witnesses:
C. N. MILLER, Jr.,
EDW. F. ULRICH.